(12) United States Patent
King (10) Patent No.: US 9,863,153 B2
(45) Date of Patent: Jan. 9, 2018

(54) BRACKET FOR A RAILING STRUCTURE

(71) Applicant: Global Innovative Products, Inc., Plymouth, MA (US)

(72) Inventor: David King, Plymouth, MA (US)

(73) Assignee: Global Innovative Products, Inc., Plymouth, MA (US)

( * ) Notice: Subject to any disclaimer, the term of this patent is extended or adjusted under 35 U.S.C. 154(b) by 0 days.

(21) Appl. No.: 15/097,023

(22) Filed: Apr. 12, 2016

(65) Prior Publication Data
US 2016/0296009 A1 Oct. 13, 2016

Related U.S. Application Data

(60) Provisional application No. 62/146,458, filed on Apr. 13, 2015.

(51) Int. Cl.
| | | |
|---|---|---|
| *F16B 2/22* | (2006.01) | |
| *E04F 11/18* | (2006.01) | |
| *F16B 2/24* | (2006.01) | |
| *E04H 17/00* | (2006.01) | |

(52) U.S. Cl.
CPC ............ *E04F 11/1808* (2013.01); *F16B 2/22* (2013.01); *F16B 2/24* (2013.01); *E04F 2011/188* (2013.01); *E04F 2011/1868* (2013.01); *E04H 17/00* (2013.01)

(58) Field of Classification Search
CPC ....... A47B 23/02; A47B 23/025; A47B 13/14; E04F 11/1808; E04F 2011/1868; F16B 2/22; F16M 13/022

USPC .......................................................... 108/42
See application file for complete search history.

(56) References Cited

U.S. PATENT DOCUMENTS

| | | | | | |
|---|---|---|---|---|---|
| 2,686,701 | A | * | 8/1954 | Manczur ................. | A47C 7/68 108/157.11 |
| 2,797,973 | A | * | 7/1957 | Culpepper ............... | A47C 7/68 108/157.11 |
| 3,146,986 | A | * | 9/1964 | Gorth, Jr. ............... | A47B 23/02 108/159.11 |
| 5,240,214 | A | * | 8/1993 | Birnbaum .............. | A47G 7/044 248/214 |
| 5,909,922 | A | * | 6/1999 | Dugas ..................... | A47C 7/70 108/43 |
| 6,082,270 | A | * | 7/2000 | Zerger ................... | B60N 3/001 108/42 |
| 6,702,166 | B1 | * | 3/2004 | Niemivuo ............... | A47G 23/06 108/43 |
| 7,121,213 | B2 | * | 10/2006 | Viazanko ............... | A47B 13/08 108/42 |
| 7,703,724 | B2 | * | 4/2010 | Dalecki ................... | G06F 3/039 248/118 |

(Continued)

*Primary Examiner* — Daniel J Rohrhoff
(74) *Attorney, Agent, or Firm* — Kurt Rauschenbach; Rauschenbach Patent Law Group, LLC (57) ABSTRACT

A bracket for a railing structure includes a bottom portion comprising an inner surface that is formed in a shape that conforms to a profile of a top surface, first side surface, and second side surface of the railing structure so that the bracket can be flexibly attached to and detached from the railing structure. The inner surface is also formed in a shape that permits the bracket to slide in a longitudinal direction of the railing structure while being held firmly in a lateral direction of the railing structure. A mounting platform is positioned on a top surface of the bottom portion.

19 Claims, 6 Drawing Sheets

(56) References Cited

U.S. PATENT DOCUMENTS

| | | | | |
|---|---|---|---|---|
| 2009/0000523 A1* | 1/2009 | Ciardelli | ................ | A47B 37/04 108/42 |
| 2009/0008521 A1* | 1/2009 | Lee | ..................... | F16M 11/041 248/226.11 |
| 2013/0118072 A1* | 5/2013 | Nee | ........................ | A47G 7/045 47/67 |
| 2013/0299652 A1* | 11/2013 | Graham | ............... | F16M 11/041 248/205.1 |

* cited by examiner

BRACKET FOR A RAILING STRUCTURE

CROSS REFERENCE TO RELATED APPLICATION

The present application is a non-provisional application of U.S. Provisional Patent Application No. 62/146,458 entitled "Support System Attachable to a Railing Structure" filed on Apr. 13, 2015. The entire contents of U.S. Provisional Patent Application No. 62/146,458 are herein incorporated by reference.

INTRODUCTION

Railing structures, such as residential and commercial deck rails, are used on a large number of residential and commercial properties in the U.S. and abroad. It is often desirable to mount various objects on these railing structures for convenience and/or aesthetic appeal. These railing structures are often required to meet local and national building safety codes.

Brackets have traditionally been attached to railing structures with permanent or semi-permanent fasteners, such as screws. Some brackets for railing structures attach with various types of semi-permanent clamp apparatus. Yet other brackets attach to the railing structures with semi-permanent and permanent adhesive materials. Once attached, these brackets are not intended to move in a longitudinal direction along the railing structure without removal of the attachment means.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

Railing structures have historically been constructed out of rectangular or substantially rectangular stock wood. In recent years, railing structures have been increasingly fabricated out of plastic, composite, and metallic materials that can be easily fabricated, molded, or shaped into any desirable shape and configuration. Such railing structures are now widely used. Prior art railing support structures and brackets have not caught up to the new deck rail material fabrication technology. These prior art deck railing support structures and brackets are typically designed for use with simple rectangular railings and do not adapt well to deck railing that have non-rectangular profiles. There is a substantial need for a bracket for a deck railing structure that is easy to attach to the railing structure without the use of fasteners, clamps, and adhesives.

Figure 1:
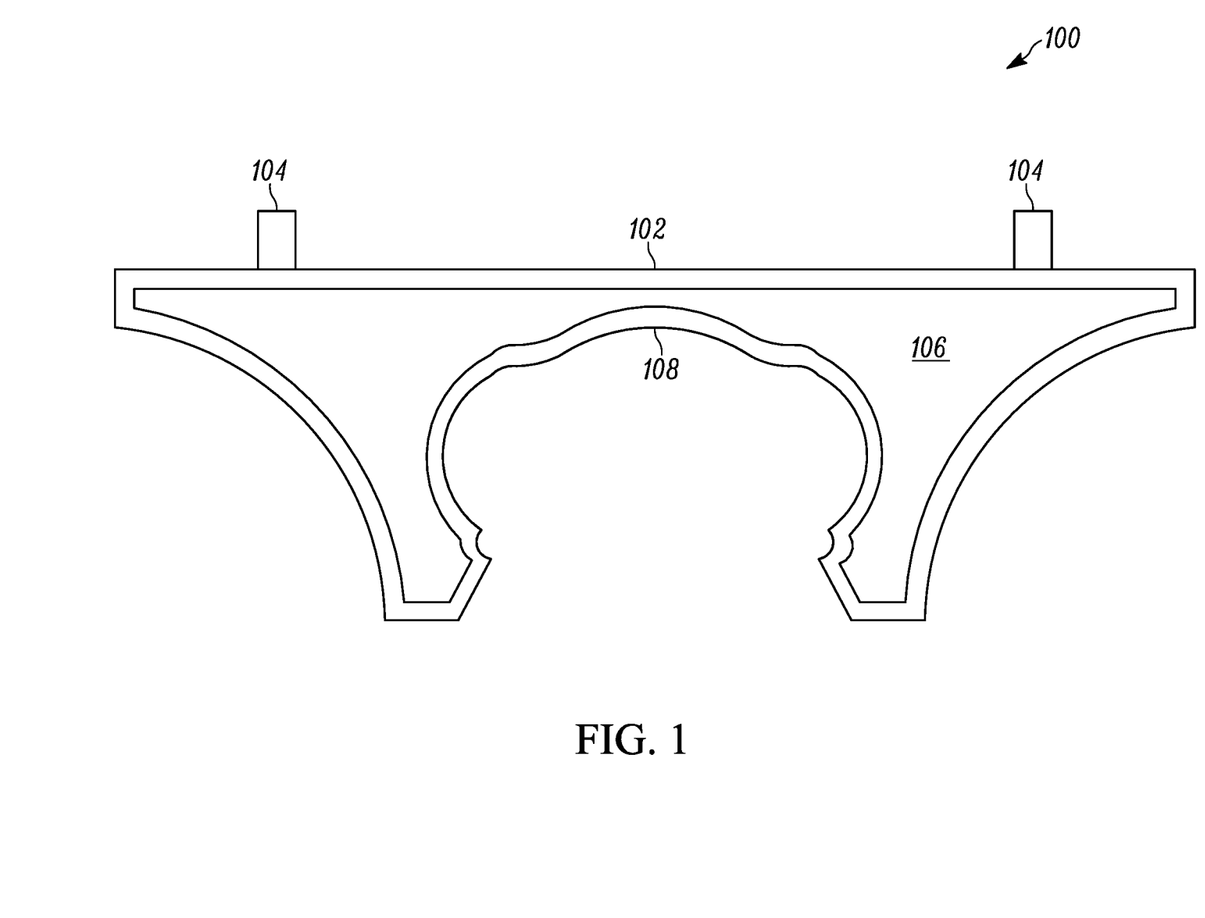
FIG. 1 illustrates a front view of a bracket according to the present teaching that slides in a longitudinal direction along a railing structure, and that is held firmly in a lateral direction by outer surfaces of the railing structure, such that it cannot easily rotate or detach from the railing.
Figure 2:
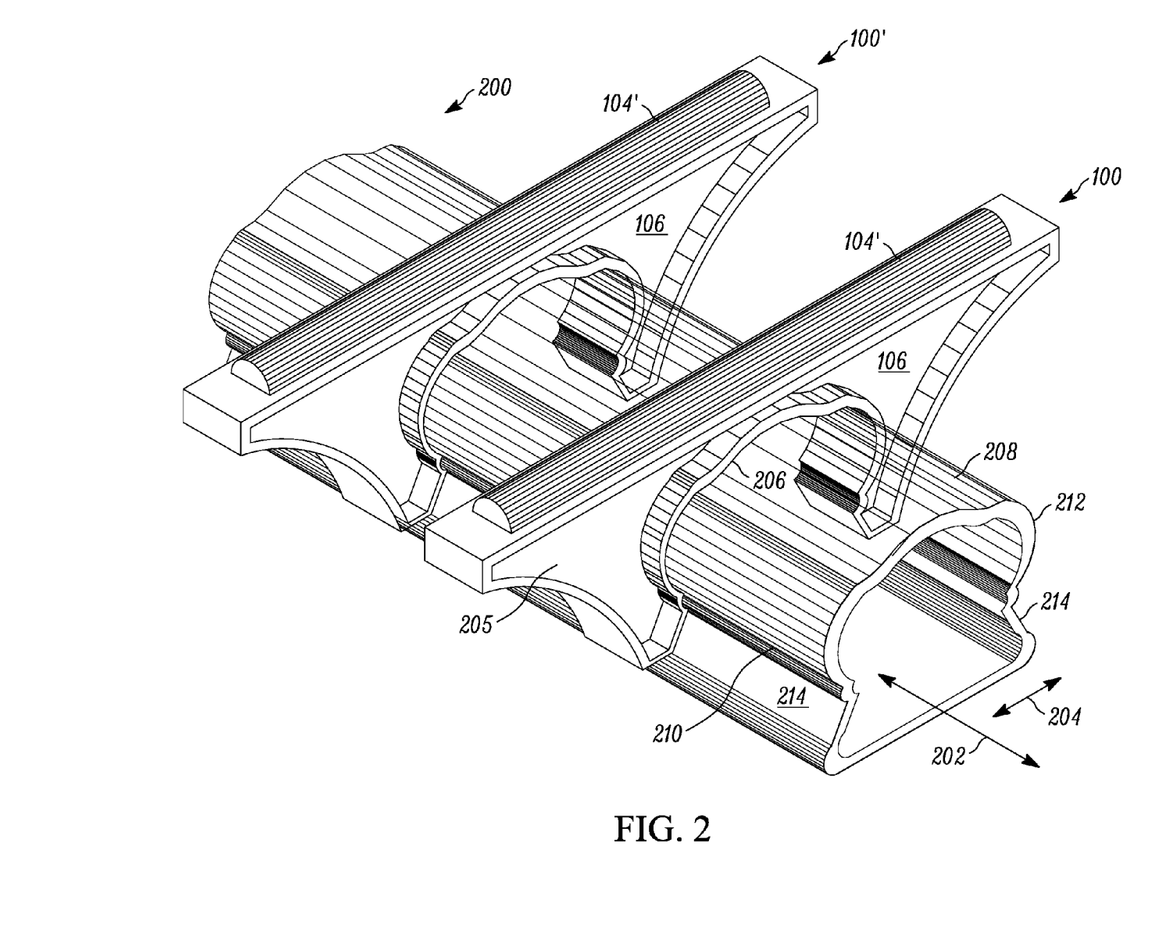
FIG. 2 illustrates a perspective view of a first and second bracket described in connection with FIG. 1 attached to a railing structure according to the present teaching.

FIG. 1 illustrates a front view of a bracket 100 according to the present teaching. FIG. 2 illustrates a perspective view of a first and second bracket described in connection with FIG. 1 attached to a railing structure 200 according to the present teaching. The bracket 100 includes a top surface 102 comprising a mounting platform 104. The top surface 102 of the bracket 100 and the mounting platform 104 are flat in many embodiments to increase the surface area that supports various objects and structures. However, one skilled in the art will appreciate that the top surface 102 of the bracket 100 can be any shape that is suitable for supporting a desired object or structure.

Various types of mounting platforms can be used. For example, the mounting platform 104 can include a first and a second post, as shown in FIG. 1, which can be formed of a slip-resistant material, such as silicon or rubber, or other material with a relatively high coefficient of friction. In another embodiment, the mounting platform 104 is a strip 104' of material, such as the strip of slip-resistant material shown in FIG. 2.

Referring to both FIGS. 1 and 2, the bottom portion 106 of the bracket 100 is formed in a shape, such that an inner surface 108 conforms to a profile of a top surface 208, first side surface 210, and second side surface 212 of the railing structure 200. It should be understood that the bracket according to the present teaching is independent of the particular shape of the railing structure and that the profile of the top surface 208, first side surface 210, and second side surface 212 of the railing structure 200 is only presented as a particular example of a railing structure that can be used with the bracket described herein. There are many commercially available railing structures with different shapes that can be used with the bracket of the present teaching. Some railing structures, such as the railing structure shown in FIG. 2, have a recessed portion 214. This recessed portion 214 has some aesthetic appeal, but also is practical in that it allows someone to easily grip the railing structure. The recessed portion 214 also aids in securing the bracket of the present teaching in the lateral direction.

In various embodiments, the bracket 100 is formed in a shape that allows it to slide in a longitudinal direction 202 along a railing structure 200 while being held firmly in a lateral direction 204 by outer surfaces 206 of the railing structure 200 such that it cannot easily rotate or detach from the railing structure 200. The term "longitudinal direction" is herein defined as the lengthwise direction of the railing structure. The term "lateral direction" is herein defined as the sideways direction, or equivalently, the direction that is perpendicular to the longitudinal direction.

One feature of the bracket according to the present teaching is that, in one embodiment, the bracket is formed in a shape that flexibly attaches to commercially available or custom railing systems with predetermined surface profiles in a manner that secures the bracket sufficiently for its intended purpose. In various embodiments of the present teaching, the intended purpose of the bracket is to firmly hold various objects and structures. In some embodiments, the bottom portion 106 of the bracket 100 further comprises a recessed portion 205 that allows the consumer to grip the bottom portion so that it can easily be attached and detach to the railing structure.

The term "flexibly attached" is herein defined as attaching to the railing structure by flexing the bracket so that it moves enough to pass over the railing and then engage or snap onto the profile of the railing structure. The ability to snap the bracket onto the deck railing structure is particularly useful because it allows for simple attachment and detachment of the bracket by the consumer without disassembling the deck railing structure, and without using any type of fastener or adhesive. In order for the bracket to easily snap onto the deck railing structure, the bracket can be constructed of a material with enough flexibility, given the desired dimensions, to engage or otherwise snap into recessed portions 214 on the first and second sides 210, 212 of the railing structure.

Another feature of the bracket of the present teaching is that the bracket 100 is formed in a shape that conforms to a profile of a top surface 208, first side surface 210, and second side surface 212 of the railing structure 200 in such a manner as to secure the bracket 100 in the vertical direction so that there is no or minimal motion in the vertical (up and down) direction. This feature, along with other features, provides a bracket for a railing system that provides a stable support for many different types of objects and structures.

The bracket 100 can be formed of numerous types of material. For example, in one specific embodiment, the bracket 100 is formed of a plastic material, such as Polyvinyl Chloride (PVC) or Acrylonitrile Butadiene Styrene (ABS) plastic material. In other embodiments, the bracket 100 is formed of one or more composite materials. The bracket 100 may also be formed of a metal such as aluminum, stainless steel, or any other type of corrosion resistant metal or metal alloy. In many embodiments, the bracket 100 is formed of a material that is resistant to UV radiation in order to improve the usable lifetime of the product.

In one particular embodiment, the bracket 100 is formed of substantially the same material as the railing structure 200. In these embodiments, the coefficient of thermal expansion for the bracket 100 and the railing structure 200 is the same so that the bracket 100 remains in conformal communication with the railing structure 200, where the coefficient of friction between the bracket 100 and the railing structure 200 remains substantially the same as a function of temperature, thereby allowing the consumer to slide the bracket along the railing structure with a force that is substantially independent of temperature. In another embodiment, the coefficient of thermal expansion of the railing structure material is greater than the coefficient of thermal expansion of the bracket 100 so that during warmer weather, the railing structure expands into the inner surface 108 of the bracket 100 increasing the coefficient of friction between the bracket 100 and the railing structure 200 making it more difficult to slide the bracket along the railing structure.

In many embodiments, the bracket 100 is formed of a somewhat flexible material, which is sufficiently flexible to deform and allow the bracket 100 to engage or snap over the railing structure 200, and then to provide a coefficient of friction that permits the bracket 100 to slide in a longitudinal direction 202 along a railing structure 200 while being held firmly in a lateral direction 204 by outer surfaces 206 of the railing structure 200, such that it cannot easily rotate or detach from the railing structure 200.

The brackets 100 and 100' shown in FIG. 2 can be used as tray brackets that are placed in series on the railing structure 200, such that together they support an object, such as a food serving or other type of tray, that is placed on the posts 104 or strips 104'. This configuration is referred to as a tray platform. The slip-resistant material surfaces on the posts 104 or strips 104' prevents or inhibits objects placed on them from moving. The width between the two brackets 100, 100' is easily adjusted by sliding the brackets 100, 100' closer together or further apart along the railing structure.

Deck railing structures used in both commercial and residential properties are often constructed at a height that makes them suitable to hold objects and structures that the consumer can readily access. For example, a deck railing structure can be used to support a flat surface upon which other items may be placed, such as food trays, cup holders, planters, and numerous other objects and structures.

Figure 3:
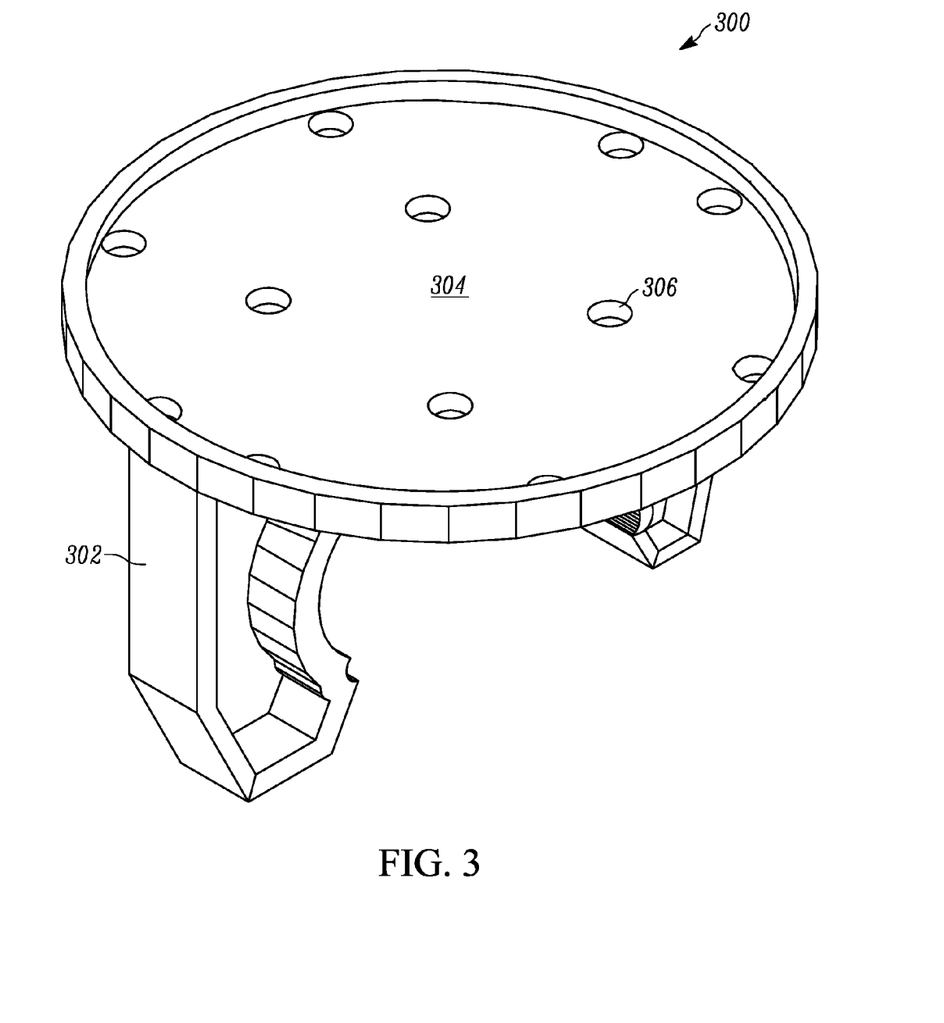
FIG. 3 illustrates a bracket including a bottom portion and a top surface comprising a circular mounting platform according to the present teaching.
Figure 4:
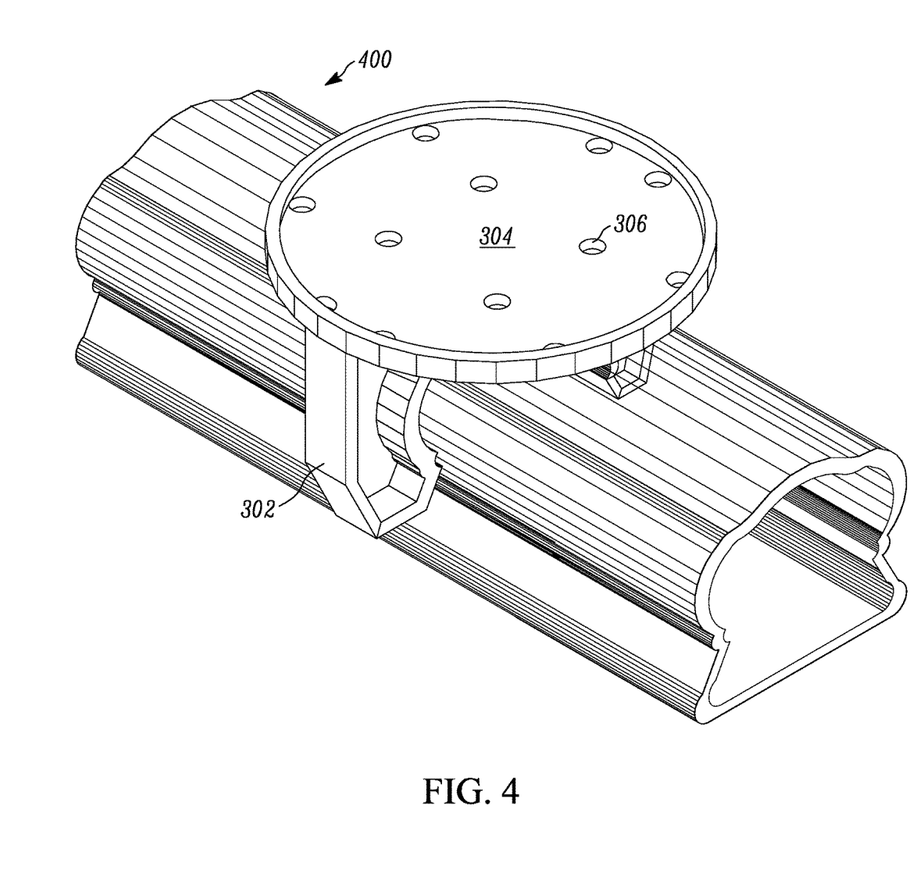
FIG. 4 illustrates a perspective view of the bracket described in connection with FIG. 3 attached to a railing structure according to the present teaching.

FIG. 3 illustrates a bracket 300 including a bottom portion 302 and a top surface comprising a circular mounting platform 304 according to the present teaching. FIG. 4 illustrates a perspective view of the bracket 300 described in connection with FIG. 3 attached to a railing structure 400 according to the present teaching. Referring to both FIGS. 3 and 4, the bottom portion 302 is similar to or identical to the bottom portion 106 that was described in connection with FIG. 1. This configuration may be used as a cup or beverage holder platform.

The circular mounting platform 304 includes a plurality of apertures or holes 306 that can be used in various ways. In one method of using the bracket 300 according to the present teaching, the holes 306 are used as drainage holes to assist in drying the platform 302. Rainwater will drain through the holes as well as moisture from condensation on objects such as cold beverage containers. Apertures positioned at or near the perimeter of the top surface can be used to mount a support structure, such as the support structure described in connection with FIG. 5. In another method of using the bracket 300 according to the present teaching, the holes 306 are used as fastener holes to attach one or more objects to the mounting platform 304.

Figure 5:
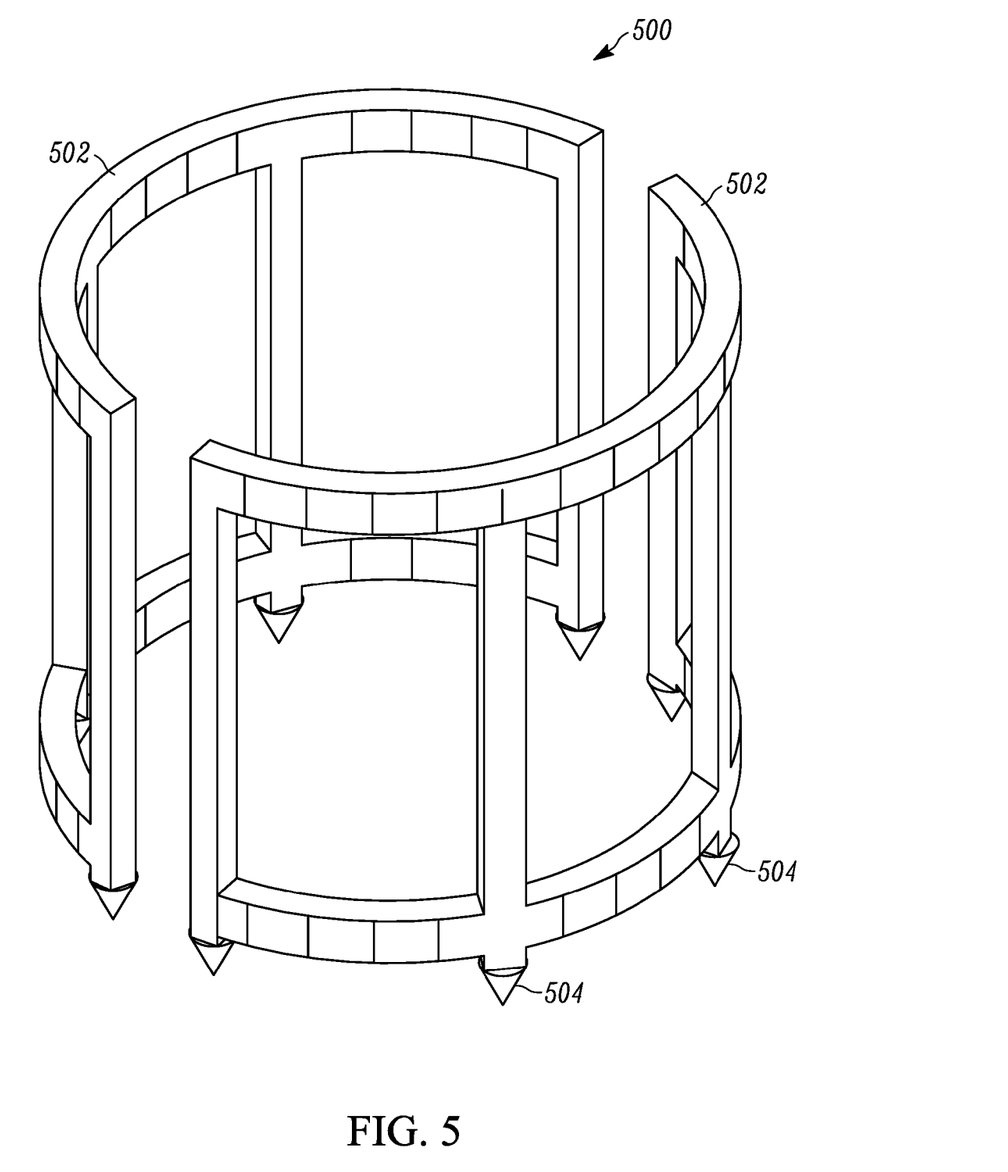
FIG. 5 illustrates a removable vertical support structure according to the present teaching that can be used with the bracket that includes the bottom portion and the top surface comprising the circular mounting platform that is described in connection with FIGS. 3 and 4.

FIG. 5 illustrates a removable vertical support structure 500 according to the present teaching that can be used with the bracket 300, and includes the bottom portion 302 and the circular mounting platform 304 that is described in connection with FIGS. 3 and 4. The circular mounting platform 304 with the removable vertical support structure 500 is particularly well suited for a platform that supports a beverage container. Referring to FIGS. 3-5, the vertical support structure 500 comprises of a pair of vertical members 502 that include fasteners 504 that fit into the holes 306. In one specific embodiment, the fasteners 504 have shaped tips 504 that, when inserted into the holes 306 secure the vertical members 502 in place. In one embodiment, the vertical members 502 are constructed of a flexible material that can be formed flat and then bent and shaped to fit and have the fasteners 504 be inserted into the respective holes 306 arranged proximate to the perimeter of the circular mounting platform 304. The natural restoring force in the bent flexible material will tend to force the vertical members 502 against the outer surface of the holes 306 locking them into place.

In one embodiment, the vertical members 502 can be constructed of the same material as the bracket 300. Numerous types of plastic and composite materials can be used. In this embodiment, the bracket 302 and vertical members 502 each have the same coefficient of thermal expansion so that they expand and contract at substantially the same rate as a function of temperature. The matching thermal expansion reduces the probability that the fasteners 504 in the vertical members 502 detach from the circular mounting platform 304.

Figure 6:
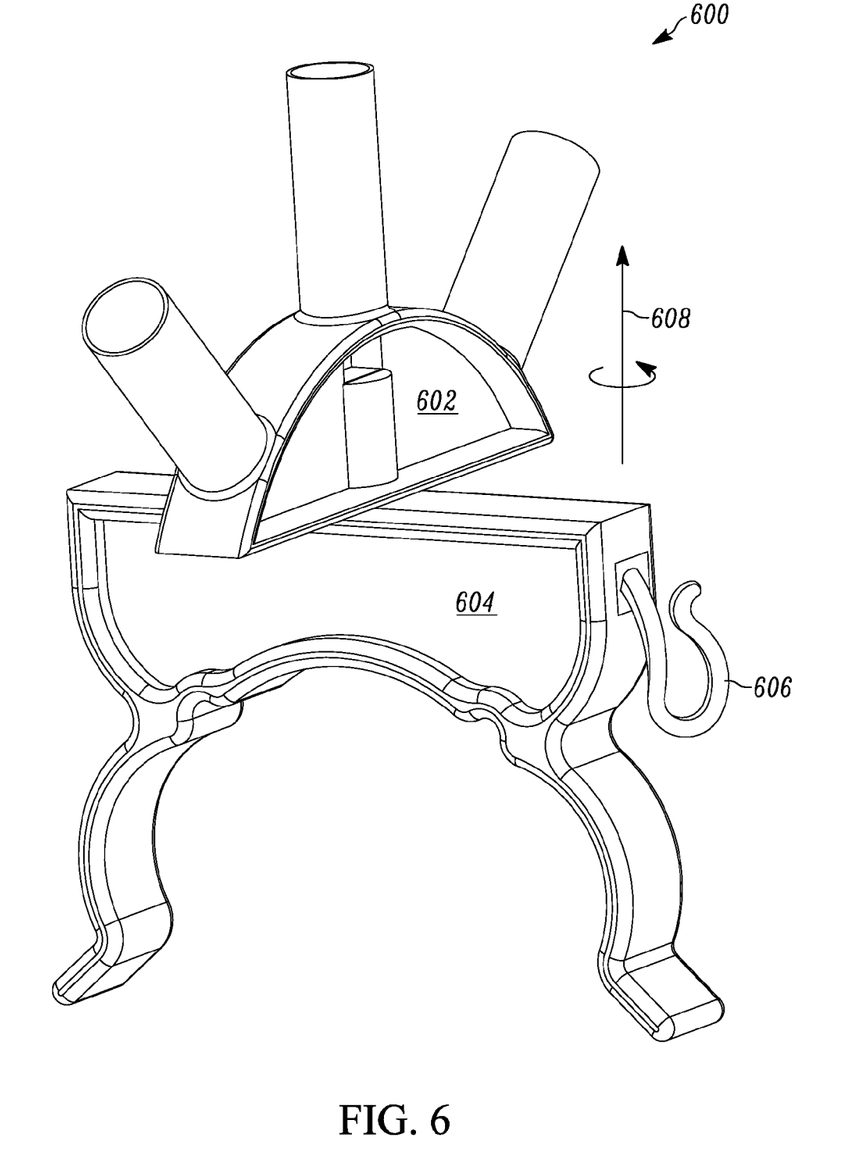
FIG. 6 illustrates a perspective view of a bracket with rotatable mounting platform according to the present teaching.

FIG. 6 illustrates a perspective view of a bracket 600 with rotatable mounting platform 602 according to the present teaching. The bracket 600 includes a bottom portion 604 that is similar to or identical to the bottom portion 106 that was described in connection with FIG. 1. In addition, the bottom portion 604 includes a clip or hook 606 that can be used as a type of hanger, for example, to secure rope lighting and/or any other type of decorative item.

In many embodiments, the rotatable mounting platform 602 rotates a full 360 degrees around the normal 608 to the top surface of the bottom portion 604 of the bracket 600. The rotatable mounting platform 602 can include numerous types of mounting structures. In the example shown in FIG. 6, the rotatable mounting platform 602 includes vertical support structures that can be flag holders or holders to secure lighting or similar apparatus and/or objects.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

I claim:
1. A tray bracket for a deck railing structure, the tray bracket comprising:
   a) a bottom portion comprising an inner surface that is formed in a shape that conforms to a predetermined surface profile of a top surface, first side surface, and second side surface of the deck railing structure, the shape allowing the bottom portion to slide in a longitudinal direction along the deck railing structure while being held firmly in a lateral direction by outer surfaces of the deck railing structure such that it cannot rotate, the tray bracket being formed of a material that is sufficiently flexible to deform, allowing the bottom portion to snap over the deck railing structure; and
   b) a tray platform positioned on a top surface of the bottom portion of the bracket.
2. The tray bracket of claim 1 wherein the tray bracket is formed of polyvinyl chloride.
3. The tray bracket of claim 1 wherein the tray bracket is formed of acrylonitrile butadiene styrene.
4. The tray bracket of claim 1 wherein the tray bracket is formed of a composite material.
5. The tray bracket of claim 1 wherein the tray bracket is formed of a metallic material.
6. The tray bracket of claim 1 wherein the tray bracket is formed of stainless steel.
7. The tray bracket of claim 1 wherein the tray platform comprises a slip-resistant material positioned on the top surface of the tray platform.
8. The tray bracket of claim 1 wherein the tray bracket further comprises a hook.
9. The tray bracket of claim 1 wherein the bottom portion comprises a hook.
10. The tray bracket of claim 1 wherein the bottom portion of the tray bracket further comprises a recessed portion that allows the consumer to easily attach and detach to the fixed railing structure.
11. A beverage holder comprising:
    a) a bracket comprising a bottom portion comprising an inner surface that is formed in a shape that conforms to a profile of a top surface, first side surface, and second side surface of a deck railing structure, the shape allowing the bottom portion to slide in a longitudinal direction along the deck railing structure while being held firmly in a lateral direction by outer surfaces of the deck railing structure such that it cannot rotate, the bottom portion being formed of a material that is sufficiently flexible to deform allowing the bottom portion to snap over the deck railing structure; and
    b) a beverage holder platform positioned on a top surface of the bottom portion of the bracket and comprising a vertical support structure.
12. The beverage holder of claim 11 wherein the beverage holder platform defines a plurality of apertures that allows fluid to drain.
13. The beverage holder of claim 11 wherein the vertical support structure is attachable and detachable with a plurality of fasteners.
14. The beverage holder of claim 11 wherein the beverage holder platform comprises a plurality of apertures for fasteners to attach objects to the beverage holder platform.
15. The beverage holder of claim 11 wherein the beverage holder platform comprises a rotatable mounting platform.
16. The beverage holder of claim 11 wherein the beverage holder platform is attached to the bottom portion with a flexible fastener.
17. The beverage holder of claim 11 wherein the bottom portion comprises a hook.

18. The beverage holder of claim 11 wherein the bottom portion further comprises a recessed portion that allows the consumer to easily attach and detach to the fixed railing structure.

19. The beverage holder of claim 11 wherein the platform comprises a slip-resistant material positioned on the top surface of the beverage holder platform.

* * * * *